US011193384B2

(12) United States Patent
Stoyanov et al.

(10) Patent No.: US 11,193,384 B2
(45) Date of Patent: Dec. 7, 2021

(54) LOW FRICTION, WEAR RESISTANT DRY FACE CARBON SEAL—SEAL SEAT ASSEMBLY

(71) Applicant: United Technologies Corporation, Farmington, CT (US)

(72) Inventors: Pantcho P. Stoyanov, West Hartford, CT (US); Mark B. Gossner, Durham, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 129 days.

(21) Appl. No.: 16/574,589

(22) Filed: Sep. 18, 2019

(65) Prior Publication Data

US 2020/0088055 A1    Mar. 19, 2020

Related U.S. Application Data

(60) Provisional application No. 62/733,596, filed on Sep. 19, 2018.

(51) Int. Cl.
*F01D 11/00* (2006.01)
*C01B 32/20* (2017.01)

(52) U.S. Cl.
CPC ............ *F01D 11/005* (2013.01); *C01B 32/20* (2017.08)

(58) Field of Classification Search
CPC ...... F01D 11/00; F01D 11/005; F01D 11/006; F01D 11/008; C01B 32/00; C01B 32/20
USPC ........................................................ 277/345
See application file for complete search history.

(56) References Cited

U.S. PATENT DOCUMENTS

| 7,754,350 B2* | 7/2010 | Freling | ...................... C23C 4/06 428/698 |
| 7,837,199 B2* | 11/2010 | Craig | .................... F01D 11/003 277/377 |
| 7,985,703 B2* | 7/2011 | Freling | ................... C23C 30/00 501/87 |
| 8,336,885 B2* | 12/2012 | Freling | ..................... C23C 4/06 277/404 |
| 9,726,031 B2* | 8/2017 | Cusack | ................ F16J 15/3284 |
| 2018/0112711 A1* | 4/2018 | Itadani | ................... F16J 15/363 |

FOREIGN PATENT DOCUMENTS

WO    2017149263 A1    9/2017

OTHER PUBLICATIONS

Luo, Tribofilms in solid lubricants (Year: 2013).*
Dmitrieve, MD sliding simulations of amorphous tribofilms consisting of either SiO2 or Carbon (Year: 2016).*
Fuadi, Formation of Carbon-based tribofilm under palm methyl ester (Year: 2018).*
http://www.amardeepsteel.com/carbon-seals.html.

(Continued)

*Primary Examiner* — Nathan Cumar
(74) *Attorney, Agent, or Firm* — Bachman and Lapointe PC; George Coury

(57) ABSTRACT

A method for preparing a seal assembly for a gas turbine engine, comprising a seal comprising a carbon material; and a seal seat positioned for rotation relative to the seal, wherein the method comprises the steps of: pre-filming a sealing surface of the seal seat with a carbon-based tribofilm; and assembling the seal seat relative to the seal in a gas turbine engine.

9 Claims, 3 Drawing Sheets

(56) References Cited

OTHER PUBLICATIONS

European search report for patent application No. 19198459.0-1015 dated Feb. 17, 2020.
European office action for patent application No. 19 198 459.0 dated Aug. 6, 2021.

* cited by examiner

LOW FRICTION, WEAR RESISTANT DRY FACE CARBON SEAL—SEAL SEAT ASSEMBLY

CROSS-REFERENCE TO RELATED APPLICATION

Benefit is claimed of U.S. Patent Application No. 62/733,596, filed Sep. 19, 2018, and entitled "LOW FRICTION, WEAR RESISTANT DRY FACE CARBON SEAL—SEAL SEAT ASSEMBLY", the disclosure of which is incorporated by reference herein in its entirety as if set forth at length.

BACKGROUND

The disclosure relates to a seal assembly, and more particularly to a bearing seal for a gas turbine engine.

Gas turbine engines have rotating elements mounted within stationary components at bearings which must be sealed to prevent escape of oil. Such seals are known as bearing seals or oil seals. One form of seal for such purpose is a carbon seal, where a carbon material seal is closely positioned around or relative to a rotating element. When first operated, such a seal results in the transfer of carbon from the carbon seal to the rotating element or seat of the seal assembly to form a film of carbon on the seat. This film is intended to have a low coefficient of friction with the seal, such that escape of oil between the seal and seat is prevented while operating at an acceptably low coefficient of friction.

This period of operation, when the film is formed, is referred to as the break-in phase of the seal. During break-in, excessive friction can be created, resulting in potential excessive wear on parts of the seal, excessive heat at locations of the seal or seat, and other issues. This issue is all the more serious in seals which are to operate at high velocity and relatively low pressure, which can increase the already high temperature due to friction. The present disclosure addresses this issue.

SUMMARY

In accordance with the present disclosure, there is provided a method for preparing a seal assembly for a gas turbine engine, comprising a seal comprising a carbon material; and a seal seat positioned for rotation relative to the seal, wherein the method comprises the steps of: pre-filming a sealing surface of the seal seat with a carbon-based tribofilm; and assembling the seal seat relative to the seal in a gas turbine engine.

In a further non-limiting embodiment, the pre-filming step comprises mounting the seal seat in a component rig.

In a still further non-limiting embodiment, the component rig is operated to apply carbon to the seal seat at a pressure*velocity (PV) of between 1300 and 7000 psi*ft/sec for a period of at least 1 minute.

In another non-limiting embodiment, the carbon-based tribofilm has a thickness of between 2 and 240 nm.

In still another non-limiting embodiment, the prefilming step comprises contacting the seal seat with a carbon-based member, which can be comprise a material selected from the group consisting of electro-graphite, carbon-graphite and mixtures thereof.

In another non-limiting embodiment, the method further comprises the step of operating the gas turbine engine after the assembling step whereby a carbon transfer film is applied over the carbon-based tribofilm during steady state operation.

In a further non-limiting embodiment, a pre-conditioned seal seat has a sealing surface and a carbon-based tribofilm on the sealing surface.

In a still further non-limiting embodiment, the carbon-based tribofilm has a coefficient of friction with a carbon-based seal of between 0.06 and 0.16.

In another non-limiting embodiment, the carbon-based tribofilm of the pre-conditioned seal seat has a thickness of between 20 and 200 nm.

Other details of the method and seal assembly are set forth in the following detailed description and the accompanying drawings wherein like reference numerals depict like elements.

DETAILED DESCRIPTION

The disclosure relates to a seal assembly for a gas turbine engine and, more particularly, to a carbon seal assembly for the oil seals of a gas turbine engine.

Figure 1:
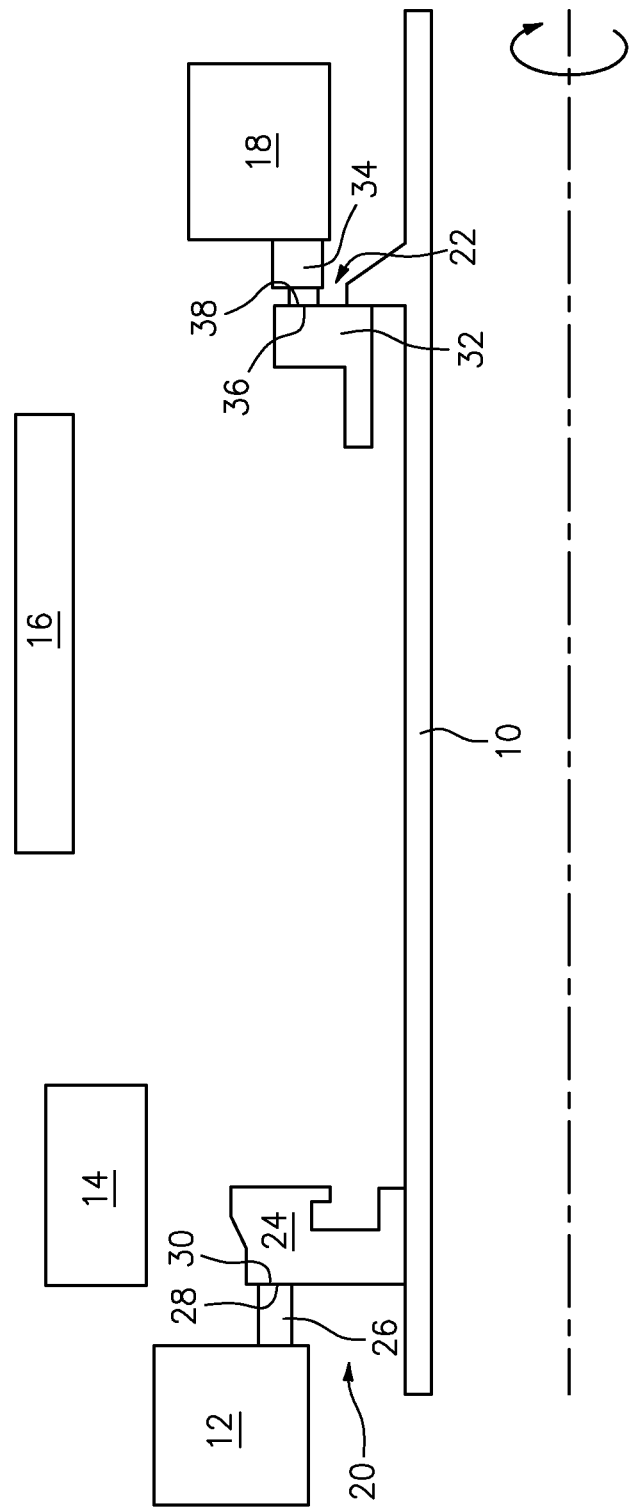
FIG. 1 illustrates a simplified cross-sectional view of a portion of a gas turbine engine.

FIG. 1 is a cross-sectional illustration of a portion of a gas turbine engine, and illustrates typical components of such an engine. Of interest to the present disclosure is a rotational shaft 10 to which are coupled various operative components of the engine, and stationary structures 12, 14, 16, 18 which cooperate with structure 10 to perform desired functions. Other features of the engine have been removed from the view of FIG. 1, or reduced to simple schematic illustration, to allow focus on features which are pertinent to the present disclosure.

In such a setting, FIG. 1 illustrates a front seal assembly 20 and a rear seal assembly 22, each of which serves to prevent leakage or flow of oil past the seal, and thereby maintain oil where desired and needed in the gas turbine engine, for example in a bearing compartment defined between the two seal assemblies 20, 22.

Seal assembly 20 is defined by a front seal seat 24 and a carbon seal 26. Carbon seal 26 remains stationary relative to rotating element 10 and seal seat 24. As shown in FIG. 1, each of these components has a sealing surface 28, 30, which together define the seal. These surfaces 28, 30 slide relative to each other and prevent leakage of oil through these surfaces. Similarly, seal assembly 22 is defined by a rear seal seat 32 and a carbon seal assembly 34, each of which defines sealing surfaces 36, 38 to prevent leakage of oil through these surfaces.

Figure 2:
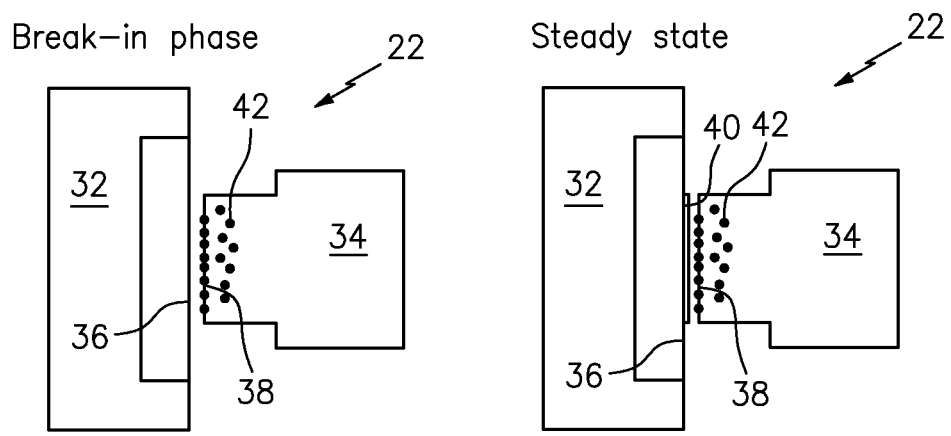
FIG. 2 illustrates a simplified cross-sectional view of a prior art seal assembly for a gas turbine engine.
Figure 3:
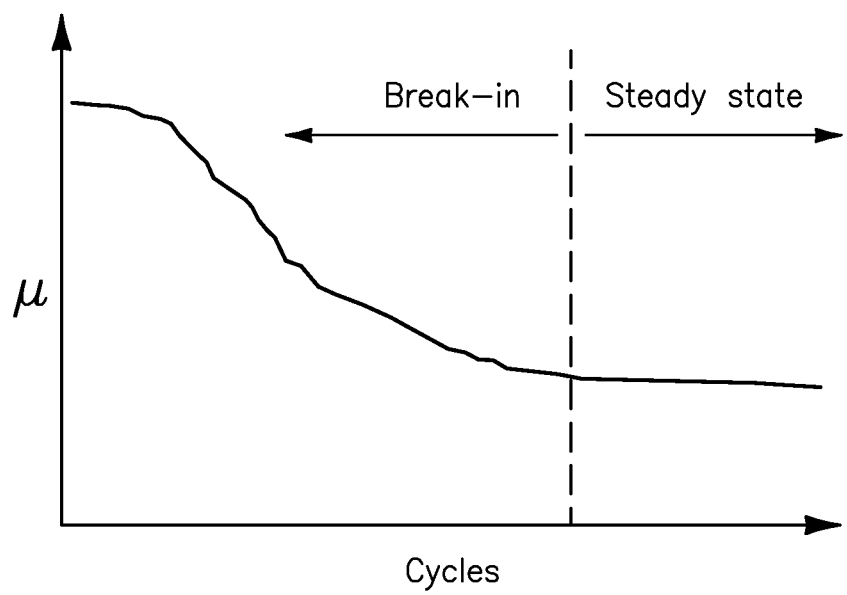
FIG. 3 illustrates coefficient of friction for the seal assembly of FIG. 2 during break-in and then steady state operation.

FIG. 2 illustrates portions of a carbon seal 34 and seal seat 32, including surfaces 36, 38. As shown, carbon seal 34 is positioned adjacent to an untreated seal seat 36, and initial operation of this seal assembly results in a break-in phase wherein a coefficient of friction between the surfaces, as shown in FIG. 3, starts relatively high and gradually decreases. The image shown in the right hand portion of FIG. 2 shows seal assembly 22 after the break-in phase. At this stage, a thin transfer film 40 has been transferred from carbon seal 34 to sealing surface 36 of seal seat 32. Once this film 40 is transferred to surface 36, seal assembly 22 operates in steady state conditions for the remainder of life of the seal assembly, and FIG. 3 shows this portion of the operation of seal assembly having a relatively lower coefficient of friction than was present during the break-in phase.

FIG. 2 shows carbon seal 34 having film controllers 42 which can be provided in carbon seal 34. These film controllers 42 serve to prevent excessive build up of thickness of the transfer film 40, thereby maintaining the desired carbon-carbon sliding surfaces defined by carbon seal 34 on one side and the transfer film 40 on the other.

Figure 4:
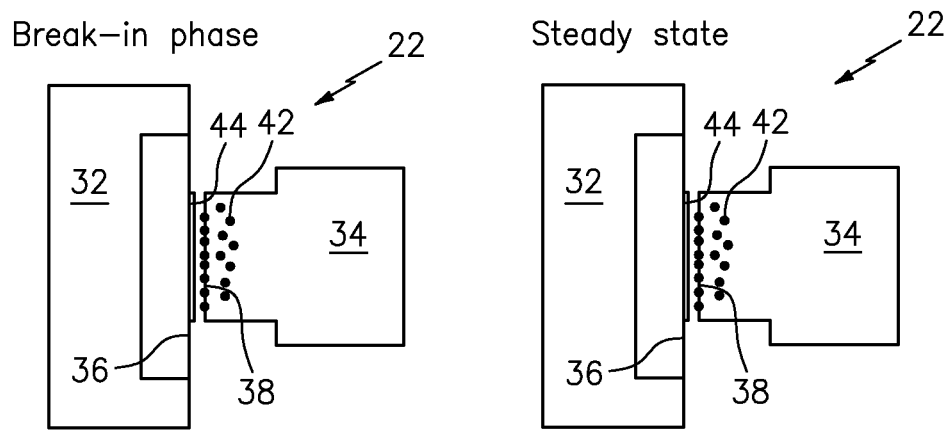
FIG. 4 illustrates a simplified cross-sectional view of a seal assembly for a gas turbine engine as disclosed herein.
Figure 5:
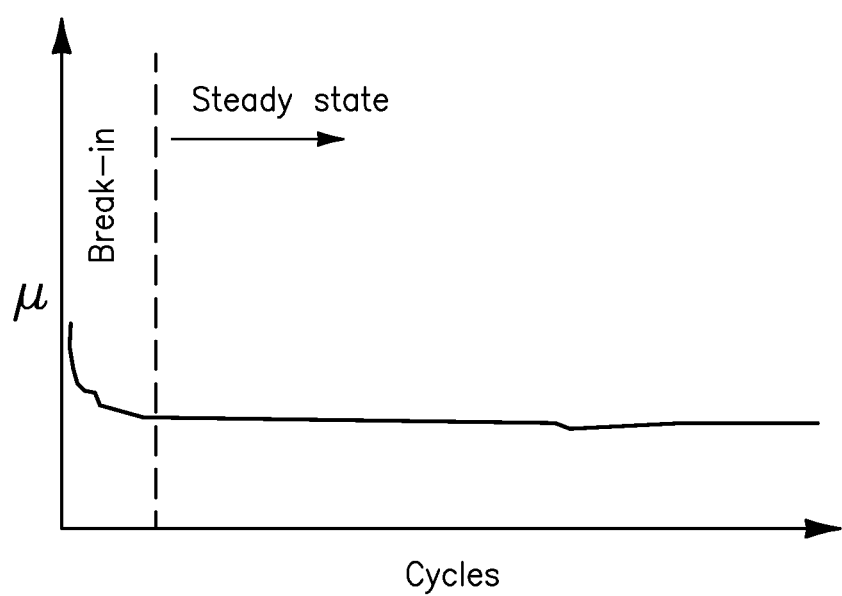
FIG. 5 illustrates coefficient of friction for the seal of FIG. 4 during break-in and then steady state operation.

FIGS. 4 and 5 together show a seal assembly wherein the seal seat is pre-conditioned as disclosed herein. Thus, in the break-in phase illustrated on the left side of the drawing, seal seat 32 already has been pre-conditioned to have a carbon-based tribofilm 44 on sealing surface 36. Thus, when operation begins, the coefficient of friction is already low due to the carbon-carbon interaction between the carbon seal and carbon-based tribofilm. Steady state operation of this seal assembly results in a transfer film of carbon material being positioned over the carbon-based tribofilm, at least to some extent, and this steady state operation leads to extended useful life of the relevant components. This is shown in FIG. 5, wherein steady state operation begins substantially immediately, without a significant break-in phase, and the coefficient of friction at steady state is relatively low as compared to that shown in FIG. 3. During operation of a gas turbine engine having a seal assembly as shown in FIG. 4, a transfer film is still eventually deposited from carbon seal 34 over DLC thin film 44, and the thickness of this transfer film is also controlled, for example by film controllers 42 which can also be present in carbon seal 34 according to this aspect of the disclosure.

Carbon seal 34 can be provided of a suitable electrocarbon such as FT2650, which is an electrographitic grade carbon. The seal seat can typically be provided from a wide variety of different materials, including but not limited to structures having a chromium carbide coated counterface or seal seat.

Film 44 can be deposited by mounting a seal seat 32 in a rig or other suitable apparatus such that a carbon-based member or body can be positioned against surface 36 of seal seat 32 and the surface is pre-conditioned or pre-filmed with a carbon-based tribofilm. The transfer film or tribofilm should be graphitic in nature (i.e. high sp2 content) with basel planes parallel to the sliding direction.

The carbon-based member can comprise a material selected from the group consisting of electro-graphite, carbon-graphite and mixtures thereof. Further, the carbon-based member can itself be a seal member, but it would of course be a different seal member than the seal ultimately to be deployed opposite the seal seat in a gas turbine engine.

The rig can suitably be operated to apply carbon to the seal seat at a pressure*velocity (PV) of between 1300 and 7000 psi*ft/sec for a period of at least 1 minutes, more suitably at least 3 minutes.

The rig can suitably be operated to apply a transfer film or tribofilm to the seal seat having a thickness of between 2 and 240 nm, more suitably between 20 and 200 nm, and still further more suitably between 50 and 140 nm.

The main characterization method for the transfer film is micro-Raman. Micro-Raman provides a 'G' and a 'D' peak values that are indicative of good film properties. One measure of a good low friction transfer film is one which has an I(D)/I(G) peak ratio of < or =1.0 based on micro-Raman analysis.

In addition, the transfer film can have a hardness which is similar to that of the seal. Thus, the transfer or tribofilm can have hardness values between 0.7 and 1.8 GPa (measured by nano-indentation).

With reference back to FIG. 1, it should be appreciated that seal 26, 34 can be mounted in a gas turbine engine by being fixed to any suitable structure or seal carrier such as structure 12, 18. Further, seal seat 24, 36 can suitably be mounted to rotational member 10 such that sealing surfaces 28, 30, and 36, 38, respectively, are in close sliding proximity to each other when rotational element 10 is rotated.

It should be appreciated that the illustrations of FIGS. 4 and 5 are presented with respect to a rear seal assembly. Illustrations of the same components for a front seal assembly are not provided herein, as the structures would be the same but for being reversed left-to-right.

It should be appreciated that the pre-application of a DLC thin film 44 (FIG. 4) in accordance with the present disclosure produces a low friction and wear-resistant carbon-based seal interface which, for example, can operate effectively between 200 and 350° F., under elevated sliding velocities. This, in turn, can reduce sub-surface heating (for example due to frictional heating) by reducing the friction co-efficient and improving the break-in phase, which will consequently improve long-term wear resistance of the seal system.

Pre-filming of the seal seat with a carbon-based tribofilm as referred to above creates a carbon-carbon interface with low friction from the beginning of operation, and therefore produces a very short break-in phase. During initial operation, a transfer film is still formed on the seal seat, specifically over the tribofilm, and this configuration remains through steady state operation of the seal.

It should be appreciated that the low friction and wear resistance produced by the seal assembly as disclosed herein can be useful, for example in bearing seals in gas turbine engines, and in other locations as well, and can significantly increase the endurance life of engine components. Further, utilization of seal assemblies as disclosed herein can significantly reduce overall costs by reducing the number of parts that are stripped prematurely due to wear and thermal damage issues.

There has been provided a seal assembly and method wherein the break-in phase is reduced in length and impact on seal components, and wherein steady state performance of the seal assembly is improved as compared to a seal assembly without the initial pre-filming step. While the seal assembly method and article has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A method for preparing a seal assembly for a gas turbine engine, comprising a seal comprising a carbon material; and a seal seat positioned for rotation relative to the seal, wherein the method comprises the steps of:

pre-filming a sealing surface of the seal seat with a carbon-based tribofilm to produce a pre-filmed seal seat having the carbon-based tribofilm on the sealing surface, wherein the pre-filming step comprises mounting the seal seat in a component rig, and contacting the seal seat in the component rig with a carbon-based member to transfer material from the carbon-based member to the seal seat and thereby produce the carbon-based tribofilm; and assembling the pre-filmed seal seat relative to the seal in a gas turbine engine.

2. The method of claim 1, wherein the component rig is operated to apply carbon to the seal seat at a pressure*velocity (PV) of between 1300 and 7000 psi*ft/sec for a period of at least 1 minutes.

3. The method of claim 1, wherein the carbon-based tribofilm has a thickness of between 2 and 240 nm.

4. The method of claim 1, further comprising the step of operating the gas turbine engine after the assembling step whereby a carbon transfer film is applied over the carbon-based tribofilm during steady state operation.

5. A pre-filmed seal seat having a sealing surface and a carbon-based tribofilm on the sealing surface, wherein the carbon-based tribofilm is applied according to the method of claim 1.

6. The seal seat of claim 5, wherein the carbon-based tribofilm has a coefficient of friction with a carbon-based seal of between 0.06 and 0.16.

7. The seal seat of claim 5, wherein the carbon-based tribofilm has a thickness of between 2 and 240 nm.

8. A method for preparing a seal assembly for a gas turbine engine, comprising a seal comprising a carbon material; and a seal seat positioned for rotation relative to the seal, wherein the method comprises the steps of:

pre-filming a sealing surface of the seal seat with a carbon-based tribofilm to produce a pre-filmed seal seat having the carbon-based tribofilm on the sealing surface, wherein the prefilming step comprises contacting the seal seat mounted in a component rig with a carbon-based member to transfer material from the carbon-based member to the seal seat and thereby produce the carbon-based tribofilm; and assembling the pre-filmed seal seat relative to the seal in a gas turbine engine.

9. The method of claim 8, wherein the carbon-based member comprises a material selected from the group consisting of electro-graphite, carbon-graphite and mixtures thereof.

* * * * *